Jan. 15, 1963   W. J. CHANCE   3,073,167
SAMPLER
Filed March 7, 1960
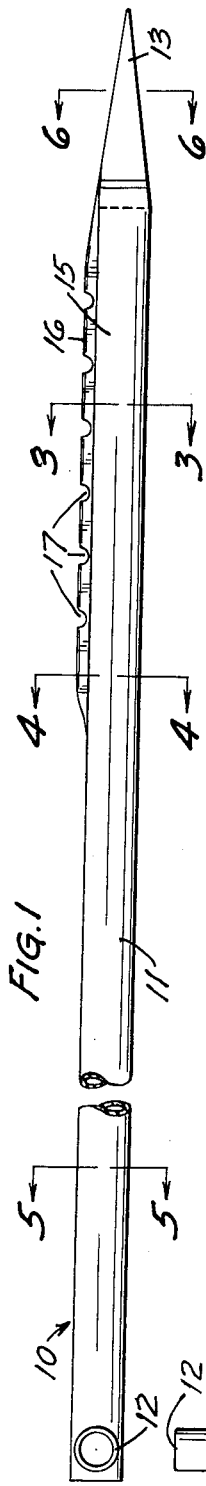
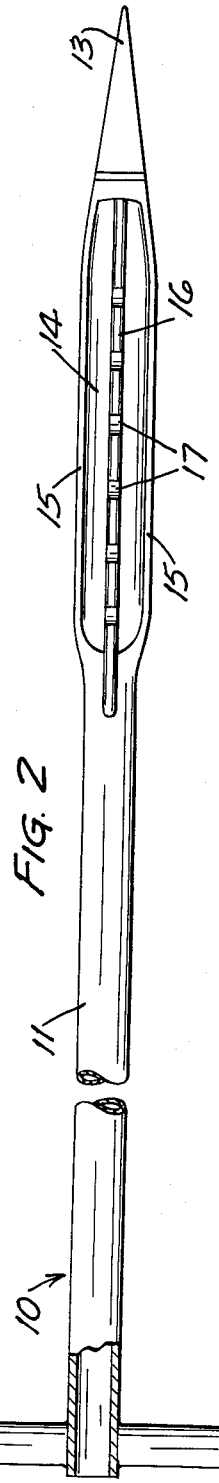
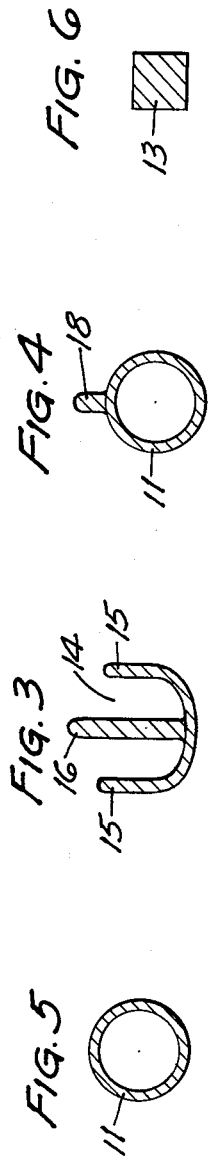
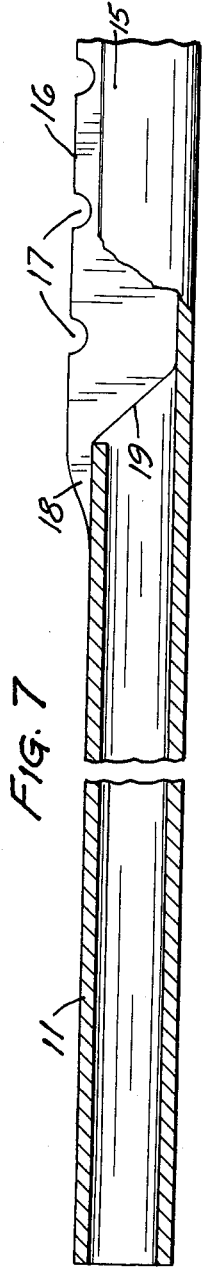
INVENTOR
WALTER J. CHANCE
BY
Gilbert B. Gehrenbeck
AGENT

United States Patent Office 3,073,167
Patented Jan. 15, 1963

3,073,167
SAMPLER
Walter J. Chance, Center Creek Township,
Martin County, Granada, Minn.
Filed Mar. 7, 1960, Ser. No. 13,066
2 Claims. (Cl. 73—425.2)

This invention relates to a probe or sampler, and in particular to an instrument suitable for taking samples of corn from cribbed ear corn, as in making moisture determinations prior to Government sealing.

A previously available ear corn probe sampler consists of an elongated tube longitudinally opened along a forward portion to form a receiving trough and provided with an external shelling bar member overlying a portion of the width of the trough. The probe is forced into the packed ear corn in the crib and is twisted to and fro around its longitudinal axis through a small angle. The shelling bar separates kernels of corn from the ears contacted, a portion of such kernels then dropping into the open trough and being removed through the open rearward end of the tube. The extended bar increases the difficulty of forcing the probe into the crib, particularly where the corn is high in moisture content; it resists the torque applied in twisting the probe; and it provides a weak point in the structure, permitting bending or breaking of the probe under the high stresses required for operation. The sharp edges of the extended bar tend to cut segments of cob as well as kernels of corn from the ears, and the cob segments then cause plugging of the tube so that the sampler must be withdrawn and cleaned before further sample may be obtained.

The present invention overcomes these and other defects and deficiencies of prior art corn-samplers and provides a rugged sampler device which by simple hand operation is easily inserted into the cribbed corn and easily twisted in separating the desired sample, which effectively and cleanly separates the kernels from the cob and resists all stresses required under the most severe operating conditions without bending or breakage, and which recovers all or substantially all of the kernels shelled.

These and other advantages are obtained by providing a rugged, low contour shelling bar centrally located along at least the open face of a trough-like section near the pointed forward end of a tubular handle member, all as exemplified in the illustrative but non-limiting form shown in the attached drawing, in which:

FIGURE 1 is a side elevation, and FIGURE 2 a plan view, of a probe sampler in accordance with the invention, FIGURES 3–6 are sectional views as indicated in connection with FIGURE 1, and FIGURE 7 is a detail view, partly in section, showing the rearward portion of the open trough and shelling bar.

The probe sampler 10 will be seen to comprise a tubular barrel 11 provided at the rearward end with a cross-handle member 12 and at the forward or probe end with a solid point 13. The barrel 11 is longitudinally slotted and the edges opened or spread apart along a short forward section, forming an open trough-like portion 14 having sides 15. Centrally located within and along the longitudinal center of the trough-like portion is a shelling bar 16 securely attached to the trough bottom and rising somewhat above the upper edges of the sides 15. The upper edge of the bar 16 is preferably lightly toothed by grooves 17, which may if desired be alternately oppositely slanted at an angle to the bar edge, and a rearward reinforcing extension 18 of the upper portion of the bar 16 is securely attached to the upper outer surface of the tube 11 adjacent the opened section, serving as a structural brace or strengthening member. Within the trough 14 and just forwardly of the extension 18 the lower and central portion of the bar 16 is removed as indicated at the curved section 19 in FIGURE 7, providing for easy access of kernels to the tube 11 from the trough 14. In samplers having substantially shorter trough openings and requiring less reinforcement, the ends of the bar are fastened to the outer surface of the tube at both ends of the trough, and the lower portion of the bar is entirely dispensed with, thus providing a completely free channel for collection of the kernels as they are broken loose and drop past the bar.

In a specific embodiment, the tube 11 is ¾ inch I.D. steel pipe having a 3/16-inch wall thickness, and the entire sampler is approximately five feet in length. The forward end terminates in a squared point formed of a steel bar welded into the end of the tube. The trough portion extends about eight inches along the forward portion just back of the point portion and is formed into a U-shaped cross-section having a flattened bottom, as shown in FIGURE 3. Centrally of the U there is affixed a shelling bar 16, constructed of ¼-inch steel strip approximately one and 3/16 inch wide, smoothly and sodily welded to the inner bottom of the trough. The upper edge of the bar is somewhat rounded and is notched at one-inch intervals to a depth of about ⅛ inch with rounded notches. The forward end of the bar 16 is welded to the rear face of the solid point member 13 and to the tube, and the rearward extension 18 is also welded, with extended fillets, to the outer upper surface of the tube 11.

The interior of the trough is smoothly finished, particularly along the fillets at the lower edges of the bar 16, and is so shaped as to permit smooth flow of the loose kernels of corn along the trough past the edge 19 and into the tube 11 as they are broken from the cobs and drop into the open trough.

The cross-handle 12 is conveniently formed of a pair of opposing short sections of ½ inch I.D. tubing welded in place as illustrated, and if desired fitted with rubber hand grips, not shown. The handle segments may be made shorter than in prior art samplers while still providing for hand application of thrust and torque fully adequate, because of the improved construction and location of the shelling bar in particular, to provide the desired sampling.

In use the sampler is forced, point first and with the open face of the trough portion positioned upwardly, into the mass of ear corn in the crib or bin and at a slight upward angle, and at the same time is twisted to and fro around its longitudinal axis through an angle of about 30 degrees more or less, by means of the handle member 12. The forward motion causes some shelling of kernels by contact with the outwardly extended notched upper edge surface of the shelling bar. The arcuate motions of the bar remove a much larger number of kernels, but the rounded edges of bar and trough do not cut the cobs. The freed kernels fall into the open trough on either side of the shelling bar and, due to the sloping position of the sampler, roll or slide toward the rear of the trough and to the open rearward end of the tube where they are collected. Substantially all of the kernels shelled by the bar are recovered.

What I claim as my invention is:

1. A corn sampler adapted for sampling ear corn in the crib, comprising an extended pointed tubular body member having rearwardly positioned handle means for forwardly thrusting and rotatively twisting said body member, said member being opened along a forward portion into a trough having a generally U-shaped cross-section, and a shelling bar centrally disposed along the length of said trough, rigidly attached along the bottom of said trough and having a shelling edge extending radially outwardly beyond the sides of said trough; said bar including a rearward reinforcing segment rigidly attached to the outer surface of said tubular body member rearwardly of said trough; the inner edge and central portion of said bar terminating well forwardly of the open entrance to said tubular body at the rearward end of said trough.

2. A corn sampler adapted for sampling ear corn in the crib, comprising an extended pointed tubular body member having rearwardly positioned cross-piece handle members and being opened along a forward portion into a trough having a generally U-shaped cross-section, and a shelling bar centrally disposed along the length of said trough, rigidly attached along the bottom and extending radially outwardly beyond the sides thereof; said bar including a rearward reinforcing segment rigidly attached to the outer surface of said tubular body member rearwardly of said trough, said bar further being smoothly toothed along the extended free edge, and the inner edge and central portion of the bar terminating well forwardly of the open entrance to said tubular body at the rearward end of said trough.

References Cited in the file of this patent
UNITED STATES PATENTS

| | | |
|---|---|---|
| 1,072,644 | Peck | Sept. 9, 1913 |
| 2,184,472 | Sand | Dec. 26, 1939 |
| 2,463,205 | Reuss | Mar. 1, 1949 |